United States Patent [19]

Proctor et al.

[11] 4,099,031

[45] Jul. 4, 1978

[54] METHOD AND APPARATUS FOR AUTOMATICALLY IDENTIFYING AN INDIVIDUAL CALLING PARTY ON A MULTIPARTY TELEPHONE LINE

[75] Inventors: D. Frederic Proctor, Redmond; Darrell D. Cole, Seattle, both of Wash.

[73] Assignee: Proctor & Associates Company, Redmond, Wash.

[21] Appl. No.: 751,994

[22] Filed: Dec. 17, 1976

[51] Int. Cl.² ............................................ H04M 15/36
[52] U.S. Cl. ................................................. 179/17 A
[58] Field of Search ............... 179/17 R, 17 A, 18 FH

[56] References Cited

U.S. PATENT DOCUMENTS

| | | | |
|---|---|---|---|
| 2,282,893 | 5/1942 | Schwartz | 179/17 A |
| 2,401,352 | 6/1946 | Hersey | 179/17 A |
| 2,615,094 | 10/1952 | Mitchell | 179/17 A |
| 3,278,687 | 10/1966 | Everett | 179/17 A |
| 3,382,322 | 5/1968 | Duerden et al. | 179/17 A |
| 3,579,254 | 5/1971 | Carmody et al. | 179/17 A |

Primary Examiner—William C. Cooper
Assistant Examiner—Randall P. Myers
Attorney, Agent, or Firm—Christensen, O'Connor, Johnson & Kindness

[57] ABSTRACT

After description of a number of prior art automatic telephone number identification systems and certain problems associated therewith, a new method and apparatus for use in such systems which overcomes the problems of the prior art is described. In its preferred form, the method includes the steps of applying to the telephone line at a central office a voltage which has a magnitude sufficient to produce a first predetermined value of loop current in the telephone line. At each party station, the loop current is caused to change between the first predetermined value and a second predetermined value in a manner unique to that party station, with the second predetermined value being smaller than the first predetermined value but greater than a value of loop current that would signify to the central office that an on-hook condition exists on the telephone line. At the central office, the loop current change is detected and compared with a plurality of stored loop current changes to provide party station identification, with each stored loop current change being unique to each party station. In a preferred embodiment, these steps occur in a predetermined time sequence, with the loop current changes also occurring at predetermined but distinct time intervals, each of which is unique to a party station. The apparatus for practicing this method includes an automatic party identifier for location at the central office and a subscriber module adapted to be located in circuit with a party station and the telephone line.

29 Claims, 5 Drawing Figures

METHOD AND APPARATUS FOR AUTOMATICALLY IDENTIFYING AN INDIVIDUAL CALLING PARTY ON A MULTIPARTY TELEPHONE LINE

FIELD OF THE INVENTION

This invention generally relates to automatic telephone number identification apparatus, and, more particularly, to a method and apparatus, for automatically identifying an individual calling party on a multiparty telephone line, which is particularly useful as a component part of and in conjunction with such automatic telephone number identification apparatus.

BACKGROUND OF THE INVENTION

Automatic telephone number identification apparatus is in widespread use in the United States and elsewhere for determining which individual telephone subscriber, or party, has placed a long-distance telephone call on a multiparty telephone line, in order that the party may be appropriately billed for the cost of the call. Such apparatus is also being increasingly used for determining the party that has placed a local telephone call. Typically, automatic telephone number identification apparatus is divided into two portions, the first being an apparatus which identifies which party on a line has made the long-distance call, and the second being an apparatus for forwarding to a toll or other central office the telephone number of the thus-identified calling party.

The present invention deals particularly with that portion of automatic telephone number identification apparatus which is used to identify the calling party. By far the most widespread identification method and apparatus known to the prior art is that commonly referred to as resistance ground automatic number identification which is particularly adaptable to those situations in which two parties share a common telephone line. Typically, one of the parties, known in the art as "party 2$8$", has located within each telephone instrument at its station a ground mark circuit, usually comprising the series connection of a resistance and an inductor which is connected to ground. For example, the ground mark circuit may comprise a portion of a coil for a ringer or bell in each telephone instrument. The telephone instruments of the other party, known in the art as "party 1", either do not have such a ground mark circuit or have the ground mark circuit therein disconnected. To provide detection of the calling party, a central office associated with the common telephone line applied a DC signal to the common telephone line upon detection of a long-distance call having been initiated on that line, usually shortly after the calling party has dialed a number for which a toll charge is to be made. If the long-distance call has been initiated by party 2, a DC imbalance between the tip (T) and ring (R) conductors of the telephone line resulting from the presence of the ground mark circuit is detected at the central office. If the call has been initiated by party 1, then no such DC imbalance is detected. The equipment at the central office then forwards the calling party's telephone number to a toll office for billing purposes.

Although simple in concept, construction, and operation, resistance ground automatic number identification presents significant problems to telephone companies in actual application. For example, each telephone instrument at each party station must have its ground mark circuit connected or disconnected in accordance with that party's designation as party 1 or party 2. It is sometimes inconvenient for a telephone company to connect or disconnect the ground mark circuit at the time of installation of each telephone instrument. Additionally, when a group of existing telephones are being converted from operator number identification to automatic number identification, burdensome problems of arranging for home visits to install ground mark circuits are presented. Furthermore, with the decline of telephone leasing, and with a corresponding increase in the number of telephones which are purchased and installed by subscribers, the control of a telephone company over the individual telephones in its system has significantly decreased to a point where the telephone company cannot assure that the telephone instruments of any given subscriber either have or do not have the ground mark circuit connected in accordance with that subscriber's party identification. Not surprisingly, these problems of installation and control have caused numerous errors in proper identification of and billing of subscribers placing long-distance telephone calls. Finally, the ground mark circuit itself and its connection to the telephone instrument must be carefully designed to minimize noise that may be present on the telephone line due to the ground connection in the ground mark circuit.

A solution to the aforementioned problems of installation, control and design of ground mark circuits is provided by the invention disclosed and claimed in copending U.S. patent application, Ser. No. 596,397, filed July 16, 1975, entitled "AUTOMATIC TELEPHONE NUMBER IDENTIFICATION CIRCUIT", by Darryl F. Proctor and Peter T. Skelly, now U.S. Pat. No. 4,001,512, Jan. 4, 1977 which is assigned to the assignee of the present invention. However, resistance ground number identification still cannot be used where more than two parties share a common telephone line.

Another two-party identification method and apparatus known to the prior art includes a pair of reverse-parallel diodes which are located at the party 2 station and in series circuit with the telephone instruments thereof and the portion of the telephone line "downstream" of the common connection of the party 1 and party 2 stations with that portion of the telephone line going to the central office. No such reverse-parallel diodes are provided in circuit with the instruments of the party 1 station. A controllable voltage source is connected to one side of the telephone line at the central office, and a voltage detector is connected to the other side of the telephone line at the central office. Upon detection of the placement of a long-distance call, the central office supplies a short across the telephone line to discharge any distributed capacitance therein. Shortly thereafter, a very small DC voltage pulse is applied by the controllable voltage source. If the telephone instrument going off-hook is in the party 1 station, this pulse will be reflected on the other side of the telephone line in the central office and will be detected by the voltage detector to signify that party 1 has placed a call. If the telephone instrument going off-hook is in the party 2 station, however, the voltage drop across the reverse-parallel connected diode pair will absorb the DC voltage pulse so that the voltage appearing on the other side of the telephone line at the central office has a value insufficient to trigger the voltage detector, therefore signifying that party 2 has placed a call.

Although avoiding many of the problems associated with resistance ground number identification, systems of this type encounter much difficulty in application in the situation where diode bridges used for polarity guards, bridge taps, line lifters and loop extenders have been installed in the line, all of which provide voltage drops which can absorb the DC voltage pulse. In addition, such systems are not applicable to party lines for more than two parties.

There are known to the prior art various method and apparatus for providing identification of a calling party for those party lines having more than two parties connected thereto. In one system utilizing such a method and apparatus, a circuit is connected to each telephone instrument in each subscriber station. Each circuit includes a diode and a resistor connected to ground, with the polarity of the diode connection and the resistance value of the resistor being unique for each subscriber station. In response to application to the line at the central office of a DC voltage having a predetermined polarity, a predetermined value and direction of current unique to the calling party exists on the line so that the calling party can be detected at the central office to provide party identification. Typically, a combination of polar and marginal relays is used to effect current polarity and current value detection. In systems of this type, only four parties can be detected, the diodes cause noise on the line, and all the other problems and limitations of the resistance ground number identification systems are encountered.

In yet another multiple party identification method and apparatus, a network is placed in circuit with each telephone instrument at the party 2, party 3, and so forth stations, with no such network being provided at the party 1 station. All the networks for each station are designed to conduct current upon the application of a predetermined voltage value thereto, usually with reference to ground, with the predetermined voltage values differing among the stations. For example, the network may include a neon tube in series-parallel connection with an adjustable resistor, with the resistor establishing a network breakdown voltage, or, the network may include a PNPN voltage breakdown diode, or its electrical equivalent including a zener diode and a switching network responsive thereto, with selection of the breakdown voltages of the neon tubes, PNPN diodes or the zener diodes being chosen to correspond to the aforementioned predetermined voltage values. A step voltage source is provided at the central office for applying, in sequence, increasing voltage values to the common telephone line. A detector is also provided at the central office for detecting when, in the sequence of voltage application, current flows thorough the common telephone line in order to provide party identification. Systems utilizing this method and apparatus are disadvantageous, however, in that again, each telephone instrument must include a proper network, and in that a constant reference or ground potential must be provided at all of the instruments at all of the stations.

Still another approach in the prior art to multiple party identification is the provision of separate conductors for each telephone instrument interconnected with contacts which are actuated upon that telephone instrument going off-hook, with the conductors being brought back to the central office or to some other detection point. In this situation, the number of conductors required for multiple parties make such systems impractical for any widespread application.

Finally, the prior art also teaches a method and apparatus in which each telephone instrument is equipped with a tone generator which is enabled upon that telephone instrument going off-hook to apply a tone signal to the telephone line. If the tone generators are designed so that each generator emits a tone distinctive of the subscriber station at which it is located, then a receiver at the central office can provide party detection in response to the actual tone that appears on the line at the central office. As with the resistance ground and other methods and apparatus described above, each telephone instrument must be modified to include a proper identification circuit, or, tone generator. Further, the existance of tones upon the lines is likely to interfere, at some point in the telephone system, with conventional apparatus for detecting tones corresponding to the number that has been dialed and to other tones utilized in the system for interconnection purposes. The tones on the line are also quite audible to the calling party.

It is therefore an object of this invention to provide, for use as part of and in conjunction with an automatic telephone number identification apparatus, a method and apparatus for automatically identifying an individual calling party on a multiparty telephone line, which method and apparatus avoids the disadvantages of the prior art previously referred to.

It is another object of this invention to provide such a method and apparatus which can be used with substantially all multiparty telephone lines, including those telephone lines which have more than two parties connected thereto.

It is still another object of this invention to provide such a method and apparatus which do not require each telephone instrument at each party station to be modified, but only require that a modification be made to that portion of the telephone line extending between the telephone instruments at a subscriber station and a common junction of all the subscriber stations with the portion of the telephone line going to the central office, thereby allowing the modification to be made without access to the telephone instruments and without access to the premises in which the telephone instruments are located.

It is a further object of this invention to provide such a method and apparatus which does not require an earth ground reference at any point, thereby avoiding the problem of noise injection into the telephone line.

It is yet a further object of this invention to provide such a method and apparatus which will furnish reliable party identification even though diode bridges, bridge taps, line lifters or most types of loop extenders are installed in conjunction with the telephone line.

SUMMARY OF THE INVENTION

Many of these objects, and other objects and advantages that will be recognized by those skilled in the art, are achieved, briefly, by a method for automatically identifying at a central office that one of a plurality of party stations interconnected with the telephone line from which a telephone call has been placed.

The method comprises a first step of, at the central office, applying to the telephone line a voltage having a magnitude sufficient to establish a first predetermined value of loop current in the telephone line. This loop current value is greater than a value that would signify to the central office that an on-hook condition exists on the telephone line.

The method comprises a second step of, at that one party station, causing the loop current to change from the first predetermined value in a manner which is unique to that one party station.

The method also comprises a third step of, at the central office, detecting the change in loop current and comparing the detected change in loop current with a plurality of stored loop current changes to provide identification of that one party station, with each stored loop current change being unique to each party station interconnected with the telephone line.

The unique manner of loop current change may be time-related, that is, the change may occur at a time which is unique to the calling party station, and party identification may be made at the central office by comparing the time of occurrence of loop current change with a plurality of predetermined time intervals, each predetermined time interval also being unique to each party station.

Alternately, the loop current may be caused to change between the first predetermined value and a second predetermined value, similar than the first predetermined value but still not low enough to signify an on-hook condition, in a manner unique to the each party station.

In a preferred embodiment, the loop current is regulated at the first predetermined value from a first time which is substantially coincident with detection of placement of the telephone call to a second time. At the second time, and thereafter, the voltage applied to the telephone line is regulated at the magnitude sufficient to produce the first predetermined value of loop current. At that one party station, the loop current is regulated at the second predetermined value at a third time which is subsequent to the second time, which current regulation is terminated at a fourth time which is subsequent to the third time and which is unique to that one party station. The central office begins monitoring the telephone line at a fifth time, subsequent to the third time, to detect a rise in the loop current toward the first predetermined value, and compares the time of the detected rise in loop current with a plurality of predetermined time intervals, each unique to a party station, to provide identification of that one party station.

In one embodiment of the invention, no such subscriber module is located in circuit with a particular one of the party stations, and detection of the placement of a long-distance call from that particular one of the party stations is made when the detected loop current at the central office does not change from the first predetermined value thereof.

The objects of the invention are also achieved, at the central office, by an automatic party identifier which is selectively interconnected with the telephone line, and, at each party station by a subscriber module adapted to be located in circuit with the telephone line and the party station.

In a preferred embodiment, the automatic party identifier includes a voltage source and means for selectively interconnecting the voltage source with the telephone line when party identification is to be made to thereby apply to the telephone line a voltage having a magnitude sufficient to produce the first predetermined value of loop current therein. Means is provided for regulating loop current in the telephone line at the first predetermined value, and for alternately regulating the magnitude of the voltage applied to the telephone line by the voltage source at the magnitude sufficient to produce the first predetermined value of loop current therein. Timing means is provided for producing a plurality of timing signals, a first one of the plurality of timing signals controlling the regulating means so that the regulating means regulates the loop current for a predetermined period of time sufficient to stabilize the loop current at the first predetermined period of time sufficient to stabilize the loop current at the first predetermined value, and so that the regulating means thereafter regulates the magnitude of the voltage applied to the telephone line. A current level detector provides a current level signal representative of loop current. Threshold means is responsive to a second one of the plurality of timing signals to compare, at a time subsequent to the predetermined period of time, the current level signal with the threshold value of the loop current, the threshold value being lower than the first predetermined value but higher than the second predetermined value, the threshold means providing an output signal when the loop current equals or exceeds the threshold value. Decoder means is responsive to a third one of the plurality of timing signals to provide a plurality of successive signals each existing during succeeding time intervals, each succeeding time interval being unique to one of the parties on the multiparty telephone line. Finally, an output means is responsive to concurrence of the output signal from the threshold means and one of the successive signals to provide a party identification signal.

In a preferred embodiment, the subscriber module includes first and second terminals adapted to be connected in series circuit with the telephone line. First means is connected between the first and second terminals for shunting current therebetween in a first predetermined direction of current. Second means is connected between the first and second terminals for controlling current therebetween in a second direction of current which is opposite to the first direction. The second means includes timing means responsive to the detection of current in the second direction for providing a plurality of successive timing signals. Current regulating means is also included for regulating the magnitude of the current in the second direction at the second predetermined value, the current regulating means initiating the current regulation in response to a first one of the plurality of timing signals and terminating the current regulation in response to a second, subsequent one of the plurality of timing signals. Finally, also included is means selectively shunting current between the first and second terminals in the second direction in response to the second one of the plurality of timing signals.

BRIEF DESCRIPTION OF THE DRAWINGS

The invention can perhaps best be understood by the reference to the following portion of the specification, taken in conjunction with the accompanying drawings in which.

DESCRIPTION OF THE PREFERRED EMBODIMENT

Figure 1:
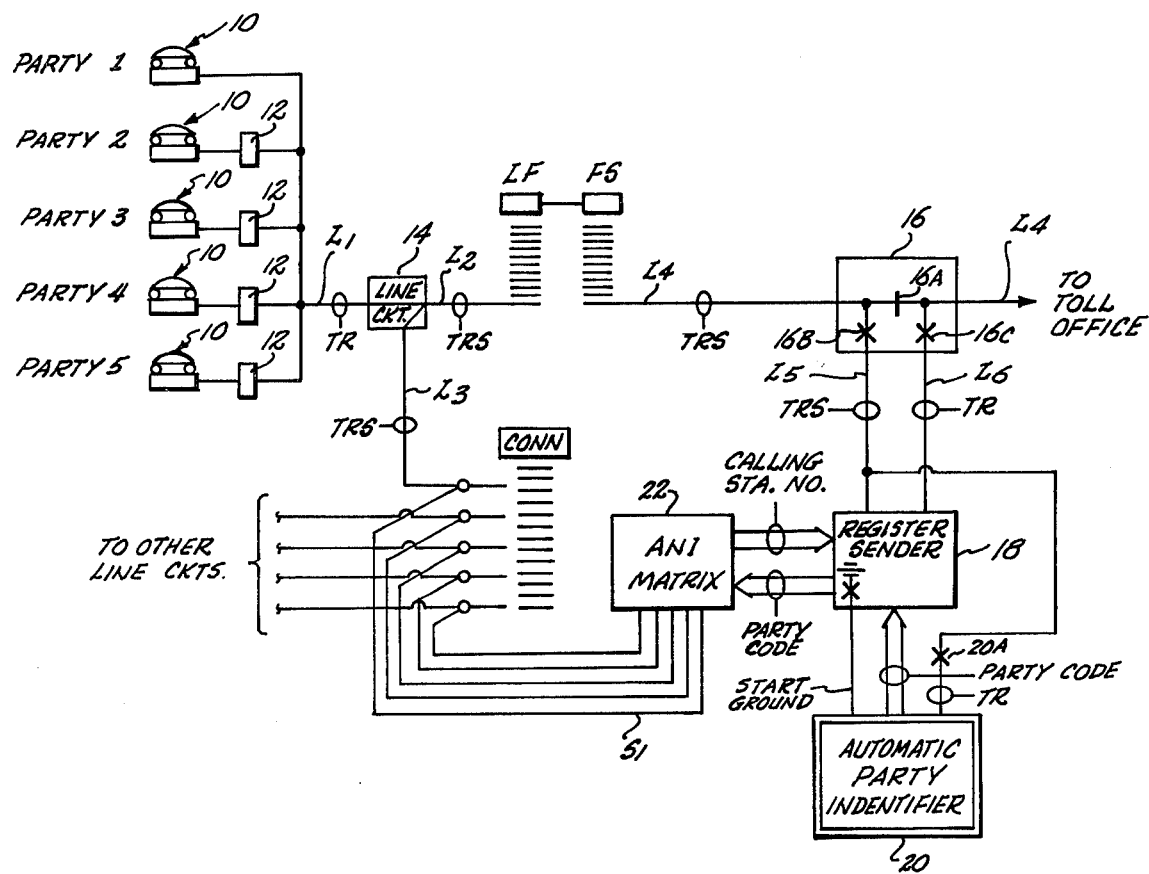
FIG. 1 is a block diagram illustrating a typical automatic number identification apparatus including the method and apparatus of the present invention.

With reference now to FIG. 1, the invention will be described with reference to its application in conjunction with a typical step-by-step central office, although it is to be clearly understood by those skilled in the art that the invention finds equal applicability in central offices using other switching schemes, such as crossbar, ESS, or the like, and in fact is generally applicable wherever identification of a calling party on a multiple party telephone line is desired.

A plurality of subscriber stations, identified as PARTY 1, PARTY 2, PARTY 3, PARTY 4 and PARTY 5 are interconnected with a commmon telephone line L1 extending between those stations and a central office. The line L1 includes a single cable pair including tip (T) and ring (R) conductors. At each station, one or more telephone instruments 10 are interconnected in parallel with the conductors, T, R of line L1. In addition, a single subscriber module 12 is placed at each subscriber station in circuit with the portion of the L1 extending between the telephoe instruments 10 at that station and a common junction of all the subscriber stations, with the exception that no such subscriber module 12 is placed in the aforementioned portion of the line L1 associated with the PARTY 1 station.

The line L1 extends to a central office and, in practice, may cover great distances and be passed through one or more loop extenders as is known to the prior art. At the central office, the line L1 terminates in a line circuit 14 which comprises one of a plurality of such line circuits located at the central office, with one such line circuit being provided for each telephone line, or cable pair, coming into the central office. It will be appreciated that some of these telephone lines will be private lines in which only a single subscriber station is connected thereto, and other telephone lines, such as the line L1 illustrated in FIG. 1, may be multiple party telephone lines having a plurality of subscriber stations connected thereto.

The line circuit 14 is interconnected by means of tip, ring and sleeve (TRS) conductors of a line L2 to a line finder (LF) which has permanently associated therewith a first selector (FS), and by means of the tip, ring and sleeve conductors (TRS) of a line L3 to a connector (CONN). The line finder LF has the line L2 and corresponding lines from the other line circuits in the central office connected to a bank of contacts thereof. Similarly, the first selector (FS) has connected to a bank of contacts thereof a plurality of outgoing trunk lines, including an outgoing direct distance dialing trunk line L4 having tip, ring and sleeve (TRS) conductors.

A line splitting circuit 16 is interposed in the trunk line L4 between the first selector (FS) and a toll office which interconnects the central office with the long distance telephone network to which other central offices are similarly connected. The line splitting circuit 16 includes normally-closed contacts 16A in the line L4, and a pair of normally-open contacts 16B, 16C connected to opposite sides of contacts 16A, all of which are relay-operated. Normally-open contacts 16B connect the line L4 to the tip, ring and sleeve (TRS) conductors of a line L5 going to a first input of a register sender 18, with the tip and ring conductors (TR) of line L5 being coupled through noramlly-open contacts 20A to an automatic party identifier 20 forming part of the present invention. Contacts 20A are controlled by a relay within automatic party identifier 20 as hereinafter described.

The register sender 18 has an output line L6 having tip and ring conductors (TR) which are connected to the line L4 through normally-open contacts 16C. The register sender 18 is also interconnected at the central office with an ANI matrix 22, with register sender 18 being capable of transmitting to ANI matrix 22 a PARTY CODE signal and receiving back therefrom a CALLING STATION NUMBER signal. The ANI matrix 22 also has connected thereto a plurality of sleeve (S1) conductors from the connector CONN, with each sleeve conductor S1 being respectively connected with a corresponding sleeve (S) conductor of the plurality of lines extending from the connector CONN to the plurality of line circuits in the central office, including the S conductor in line L3 going to line circuit 14. In this manner, the ANI matrix 22 is provided with a unique S1 conductor corresponding to each telephone line coming into the central office.

The register sender 18 is also interconnected with the automatic party identifier 20, with register sender 18 being capable of providing thereto a START GROUND signal when the identity of a calling party is to be detected, and receiving back therefrom a PARTY CODE signal identifying the calling party as PARTY 1, PARTY 2, and so formth, which is transmitted to the ANI matrix 22 as aforesaid.

Assuming now that a person at one of the subscriber stations interconnected with line L1 initiates the placing of a long-distance call, a resultant off-hook condition of the telephone instrument 10 being utilized at that subscriber station (resulting in a circuit being completed due to a corresponding termination of the conductors TR of line L1) causes a relay within the line circuit 14 to be actuated to (a) apply central office battery to line L1, (b) interconnect line L1 and L2, L3, and (c) actuate the line finder Lf. As is conventional, the line finder LF steps through its bank of contacts until it comes to rest at the bank position interconnected with line L2. At this time, dial tone is provided by the central office on line L1, by means not illustrated.

Thereafter, the calling subscriber dials the telephone number to be called. In response to recognition of a code representing a long-distance call, such as the commonly used"1" code, the first selector FS steps through its bank of contats to the bank position to which line L4 is connected, thereby completing a circuit from the telephone instrument 10 at the calling station to the toll office through line L1, line circuit 14, line L2, line finder LF, first selector FS, and line L4 (including normally-closed contacts 16A). Subsequent digits of the called telephone number, including the area code, and the called station number, are then received by and stored in a register within the toll office. Thereafter, the toll office transmits a signal back along line L4 which is detected, by means not illustrated, and used to cause the relay within line splitting circuit 16 to operate, thereby opening contacts 16A and closing contacts 16B, 16C. Accordingly, a circuit is then completed from the calling subscriber to the input of the register sender 18 through contacts 16B and line L5. At this time, the register sender 18 causes the central office battery to be removed from line L1 and applies a START GROUND signal to the automatic party identifier 20.

In response to the START GROUND signal, the automatic party identifier 20 closes contacts 20A, thereby providing a direction connection between automatic party identifier 20 and the calling station via line L5, contacts 16B, line L4, the first selector FS, the line finder LF, line L2, the line circuit 14, and line L1. The automatic party identifier 20 thereafter interrogates the line L1 to ascertain the party identification of the calling party, whether it be PARTY 1, PARTY 2, or the like, as hereinafter described. After detecting this party identification, the automatic party identifier 20 transmits a corresponding PARTY CODE signal to register sender 18 which is retransmitted to the ANI matrix 22.

Concurrently with the investigation by automatic party identifier 20, register sender 18 transmits a unique signal on the S conductor line L5 connected thereto. This unique signal will be coupled through contacts 16B, line L4, the first selector FS, the line finder LF, line L2, line circuit 14, and L3 to appear at the position of the connector CONN that is uniquely associated with the calling line, such as line L1. Accordingly, a corresponding unique signal will be transmitted on the associated conductor S1 to the ANI matrix 22 to signify thereto that the call has been placed on line L1. Stored within the ANI matrix 22 are a plurality of calling station numbers which are grouped in a first direction according to line identity and a second direction according to the designations of stations as PARTY 1, PARTY 2, etc. Therefore, the signal on conductor S1 will "mark" the positions within ANI matrix 22 associated with line L1, those positions being the PARTY 1, PARTY 2, PARTY 3, PARTY 4, and PARTY 5 positions. The PARTY CODE signal supplied by register sender 18 accordingly gates on that portion of ANI matrix 22 which has been marked by the signal on conductor S1 and which corresponds to the party identification of the calling party. In response, ANI matrix 22 supplies the CALLING STATION NUMBER output signal representing the calling station number to the register sender 18, which number is stored therein.

Register sender 18 then outpulses the stored calling number to the toll office via line L6, contacts 16C, and line L4. After this action, the register sender 18(a) removes the START GROUND signal from automatic party identifier 20, causing contacts 20A thereof to be opened, (b) causes the relay within line splitting circuit 16 to be deactuated, accordingly opening contacts 16B, 16C and closing contacts 16A, and (c) causes the central office to reapply the central office battery to line L1. At this time, a direct connection is again afforded between the calling party and the toll office so that the long-distance call may proceed.

In a preferred embodiment, the present invention functions to provide party identification in the following manner. At a first time and in response to the START GROUND signal from register sender 18, the automatic party identifier 20 begins to establish a first predetermined value of loop current (in line L5, and in line L1), and, in doing so, interrogates line L1. Preferably, this interrogation is initiated by the application of a predetermined voltage to the conductors TR of line L5, which predetermined voltage is coupled through the central office circuits previously described to line L1 and appears thereon as a voltage which is opposite in polarity to the central office battery which has just been removed from line L1. In response to this interrogation, that one of the subscriber modules 12 that is interconnected with the telephone instrument 10 that has gone off-hook begins a timing period. At a second time sufficient to allow the first predetermined value of loop current to be established in line L1, the automatic party identifier 20 terminates its control of the loop current in line L1 but continues to regulate the voltage thereacross at a level required to produce the first predetermined value of loop current. At a subsequent, third time, the subscriber module 12 associated with the calling station initiates regulation of loop current in line L1 at a second predetermined value which is lower than the first predetermined value. At a fourth time and after the passage of a predetermined time interval from the first time which is unique to the calling station, the subscriber module 12 associated therewith responds to the interrogation by terminating its regulation of loop current in line L1 and therefore allowing the loop current to rise toward the first predetermined value thereof. At successive fifth times subsequent to the fourth time, the automatic party identifier 20 is successively enabled to monitor the line L5(and thus L1) to detect a change in the signal conditions thereon. Each successive fifth time is unique to each party station and establishes a "window" subsequent to the fourth time for each party station in which identification of that party station can be made. When the loop current rises above a threshold value intermediate the first and second predetermined values thereof, the automatic party identifier 20 compares the time of such detection with the "window" then under investigation and provides a PARTY CODE signal identifying the calling party. Since the time interval between interrogation and response is unique to a given party station, this detection by the automatic party identifier 20 within a predetermined time "window" provides identification of the calling station, if tthe call has originated from any of the PARTY 2 – PARTY 5 stations. If the call has originated from the PARTY 1 station, the absence of the subscriber module 12 therein causes the first predetermined value of loop current to remain in the line L1 (and thus L5) so that detection is made by the automatic party identifier 20 shortly after the first of the successive fifth times at which it is enabled.

Figure 2:
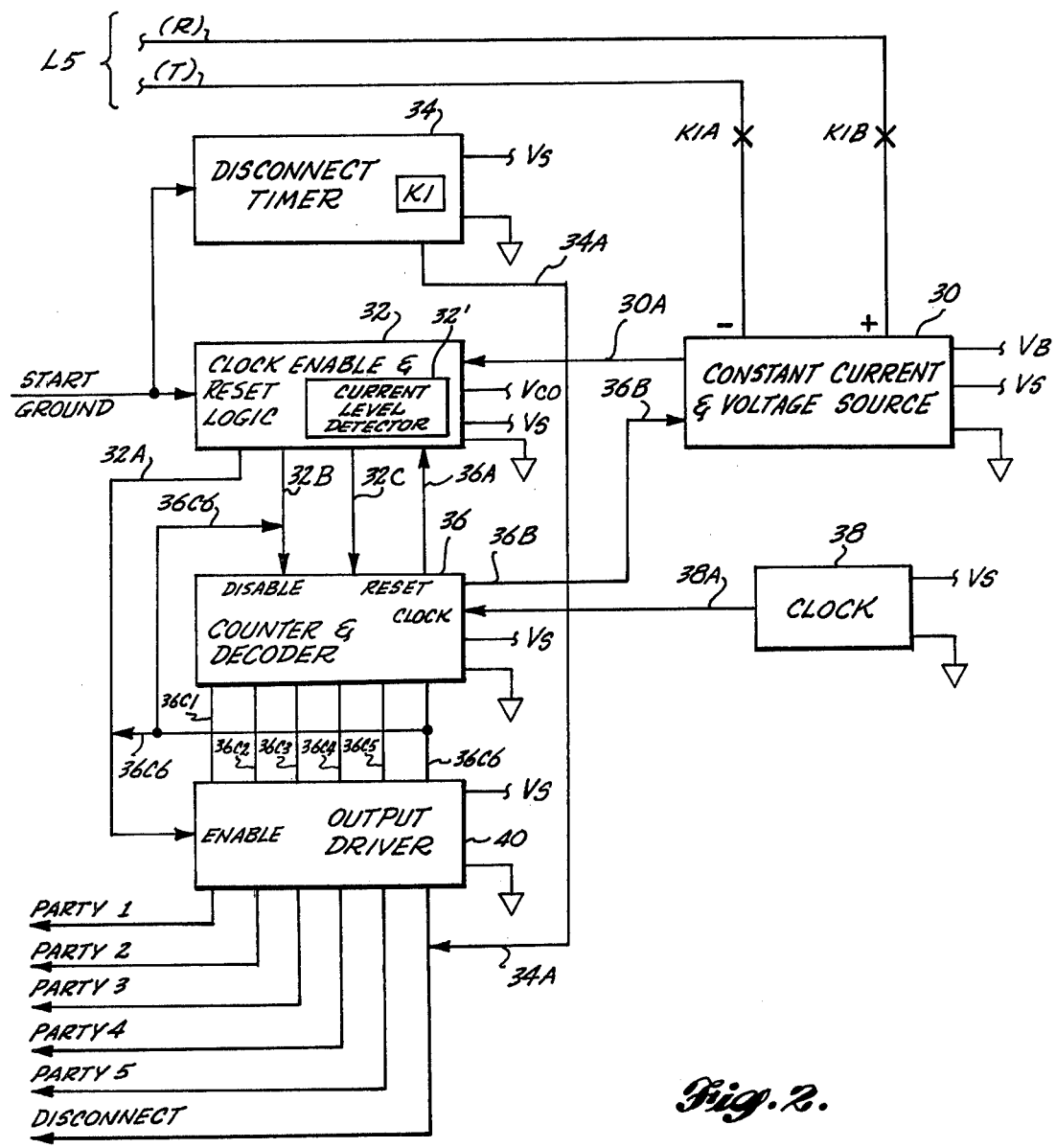
FIG. 2 is a block diagram of an automatic party identifier located at a central office as illustrated in FIG. 1 and incorporating a portion of the method and apparatus of the present invention.
Figure 3:
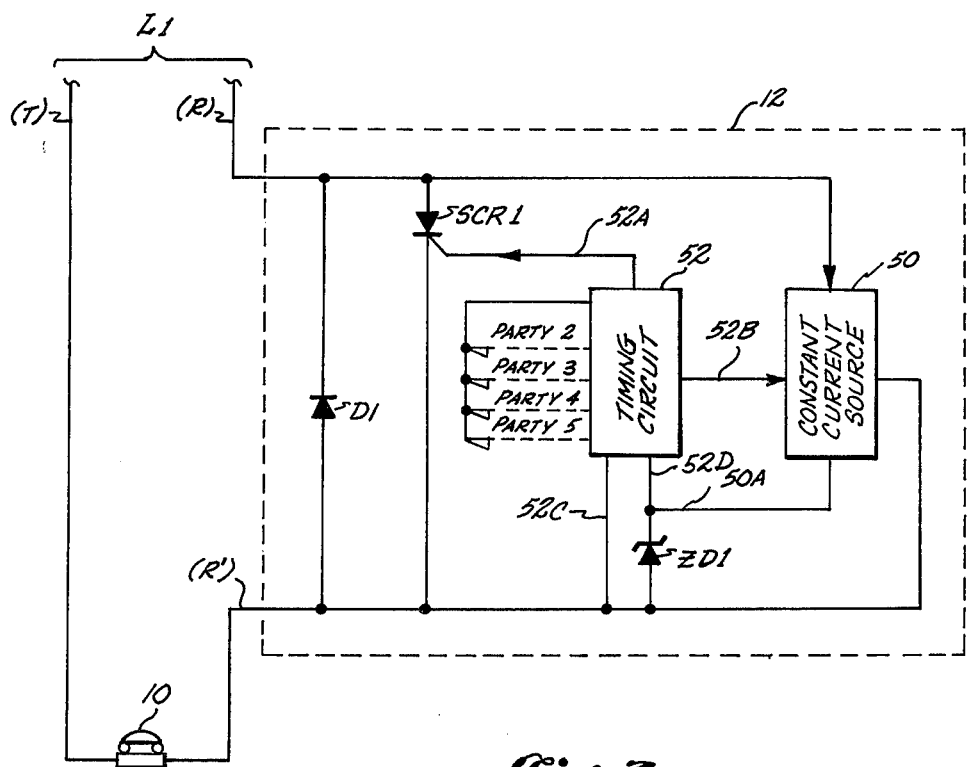
FIG. 3 is a combined schematic and block diagram of a subscriber module located at a subscriber station as illustrated in FIG. 1 and incorporating a portion of the present invention.
Figure 4:
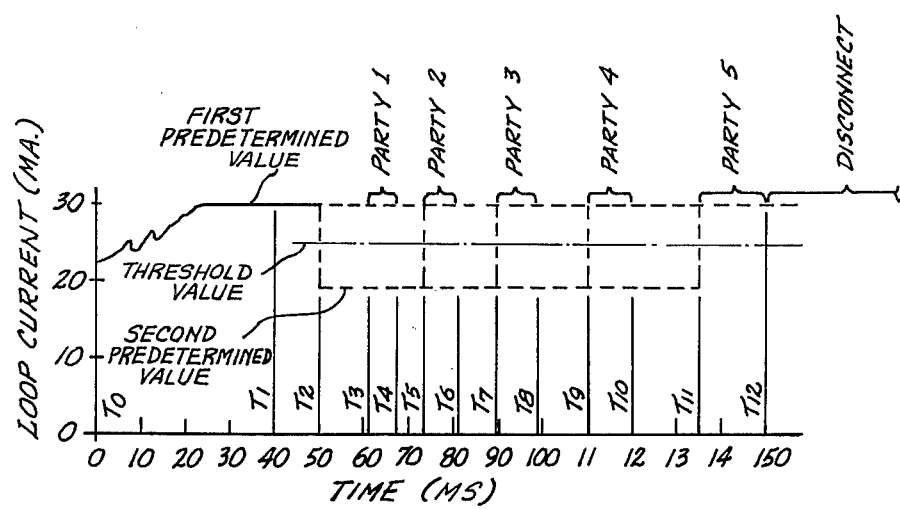
FIG. 4 is a timing diagram for use with FIGS. 2 and 3.

With reference now to FIGS. 2-4, the detailed structure and operation of a preferred embodiment of the present invention will be described.

FIG. 2 illustrates the automatic party identifier 30, FIG. 3 illustrates a typical subscriber module 12, and FIG. 4 is a timing diagram relating to the operation of the automatic party identifier 20 and the subscriber module 12.

In FIG. 2, the conductors TR off the line L5 are connected through normally-open contacts KIA, KIB of a relay K1 to first and second terminals of a constant current voltage source 30, which is also connected to a reference ground potential (isolated from earth ground) and which receives potentials of $V_B$ and $V_s$ from a power supply, not illustrated. Typically $V_B$ may have a relatively high DC potential with reference to ground, e.g., 150 volts, whereas $V_s$ has a relatively low potential with respect to ground, e.g., 12 volts. Contacts KIA, KIB correspond to contacts 20A in FIG. 1.

Constant current and voltage source 30 provides a first output on lead 30A to a clock enable and reset logic circuit 32, which has an output lead 32A going to an enable input of an output driver circuit 40, and output leads 32B, 32C going to respective disable and reset inputs of a counter and decoder circuit 36. Both the clock enable and reset logic circuit 32 and a disconnect timer 34 receive the START GROUND signal from register sender 18. In addition, the disconnect timer 34 includes the coil of relay K1 and has an output lead 34A going to a DISCONNECT output from the automatic party identifier 20 and forming party of the PARTY CODE signal coupled to register sender 18.

Counter and decoder circuit 36 has a first output lead 36A going to clock enable and reset logic circuit 32, a second output lead 36B going to constant current and voltage source 30, and a plurality of third output leads 36C1, 36C2, 36C3, 36C4, 36C5 and 36C6 going to the output driver circuit 40. In addition, output lead 36C6 is connected back to the disable input of counter and decoder circuit 36 along with output lead 32C from clock enable and reset logic circuit 32, and is connected to the enable input of the output driver circuit 40 along with output lead 32A from clock enable and reset logic circuit 32. A clock 38 is also provided which has an output lead 38A connected to a clock input of counter and decoder circuit 36.

The output driver circuit 40 has respective outputs identified as PARTY 1, PARTY 2, PARTY 3, PARTY 4, PARTY 5 and DISCONNECT which comprise the PARTY CODE signal from automatic party identifier 20.

As illustrated in FIG. 2, the disconnect timer 34, the clock enable and reset logic circuit 32, the counter and decoder circuit 36, the clock 38, and the output driver circuit 40 are each provided with the potentials $V_s$ and a reference ground potential (which is isolated from earth ground). Additionally, clock enable and reset logic circuit 32 is provided with a potential $V_{co}$ which may be obtained from the central office battery.

In each subscriber station (FIG. 3), the conductor T in the portion of line L1 going to that station is connected to one side of the telephone instrument 10 therein. the subscriber module 12 is placed in series circuit with the conductor R of line L1 and a conductor R' going to the other side of the telephone instrument 10, with additional telephone instruments at that subscriber station being connected in parallel with telephone instrument 10. In subscriber module 12, the conductor R is connected to a first terminal of a constant current source 50, with a second terminal of the constant current source 50 being connected to the conductor R'. A diode D1 and a silicon controlled rectifier SCR1 are connected in reverse-parallel configuration across the first and second terminals of source 50, with the gate electrode of silicon controlled rectifier SCR1 being connected to a first output lead 52A from a timing circuit 52 which has a second output lead 52B going to constant current source 50. A zener diode ZD1 couples the conductor R' to voltage source inputs of both the timing circuit 52 and the constant current source 50 via leads 50A and 52D. The timing circuit 52 also has a reference lead 52C connected directly to conductor R' and has connected thereto a plurality of strap connections identified as PARTY 2, PARTY 3, PARTY 4, and PARTY 5.

Referring now back to FFIG. 2, the constant current and voltage source 30, which is described in more detail hereinafter with reference to FIG. 5, applies a voltage with the polarity indicated in FIG. 2 to the conductors TR of line L5 (and accordingly, line L1) when relay K1 is energized and contacts K1A, K1B thereof are closed. Preferably, this voltage is opposite in polarity to that normally applied by the central office battery. The source 30 also functions to regulate the loop current in line L5 (and accordingly, the loop current in line L1) at a first, predetermined value, e.g., 30 milliamps (ma). However, in response to a signal on lead 36B, source 30 functions to apply a constant voltage across the conductors TR of line L5 with the polarity indicated in FIG. 2 and with a voltage value which is equal to that required to produce the first, predetermined value of loop current at the time the signal on lead 36B is supplied thereto. Finally, source 30 also supplies a signal on lead 30A which is related to the magnitude of the loop current in line L5.

The clock enable and reset logic circuit 32, which is also described in more detail hereinafter with respect to FIG. 5, functions as follows. In response to the reception of a START GROUND signal from register sender 18, circuit 32 provides an output signal on lead 32C to reset the counters within counter and decoder circuit 36. As indicated in FIG. 2, circuit 32 includes a current level detector 32' which is responsive to the signal on lead 30A to detect when the loop current exceeds predetermined threshold values thereof. After the reception of a START GROUND signal, and when the value of the loop current in line L5 has risen to a first minimum threshold value, e.g., 13 ma, as detected by the current level detector 32', circuit 32 removes the output signal on line 32C, thereby enabling counter and decoder circuit 36. The minimum threshold value is smaller than the first predetermined value of loop current and represents a condition signifying that the line L5 is not "dead", i.e., the source 30 has been connected thereto and is operative. Finally, upon the reception of a signal on line 36A from counter and deccoder circuit 36, and when the level of the loop current in line L5, represented by the signal on lead 30A, has risen to a level greater than a second threshold value, e.g., 25 ma, as detected by current level detector 32', circuit 32 provides an output signal on lead 32B to disable the counter and decoder circuit 36, and an output signal on lead 32A to enable the output driver circuit 40.

The disconnect timer 34 may comprise a simple timer circuit which is enabled by the START GROUND signal from register sender 18 for a predetermined time interval. During actuation of disconnect timer 34, relay K1 is energized. At the end of this predetermined timer interval, relay K1 is de-energized and an output signal is provided on lead 34A. As an example, the predetermined interval may be 800 milliseconds (ms).

The clock 38 may comprise a conventional clock source providing a series of clock pulses on lead 38A at a predetermined frequency, e.g., 1KHz.

The counter and decoder circuit 36 may comprise conventional counter circuits and decoding output logic which function as follows. In response to an output signal on lead 32C, the counters within circuit 36 are reset. Upon removal of the signal on lead 32C, the counters within circuit 36 begin to count the clock pulses on lead 38A from clock 38. Thereafter, output signals are successively provided on leads 36B, 36A, and 36C1–36C6 in the following manner and at the times illustrated in FIG. 4. At time T1, a momentary output signal is provided on lead 36B. At time T3, an output signal is provided on lead 36A and an output signal is provided on lead 36C1. At time T4, an output signal is provided on lead 36C2 and the output signal is removed from lead 36C1. At time T6, an output signal is provided on lead 36C3 and the output signal is removed from lead 36C2. At time T8, an output signal is provided on lead 36C4 and the output signal is removed from lead 36C3. At time T10, an output signal is provided on lead 36C5 and the output signal is removed from lead 36C4. At time T12, an output signal is provided on 36C6 and the output signal is removed from lead 36C5. Finally, the provision of a signal to the disable input of circuit 36 on either lead 32B or lead 36C6 inhibits the counters therein from being stepped by the clock pulses on lead 38A so that the output signal being provided on the leads 36C1–36C6 is retained.

The output driver circuit 40 may comprise a plurality of conventional gates and driver circuits which function as follows. In response to the concurrence of output signals on leads 36C1, 36C2, 36C3, 36C4, or 36C5 from counter and decoder circuit 36, and, an output signal on lead 32A from clock enable and reset logic circuit 32, the output driver circuit 40 provides respectively, the PARTY 1, PARTY 2, PARTY 3, PARTY 4, or PARTY 5 output signals. In response to an output signal on lead 36C6 from counter and decoder circuit 36, output driver 40 provide the DISCONNECT output signal.

In each subscriber module 12 (FIG. 3), the constant current source 50 may comprise a conventional constant current source for regulating the loop current in line L1 (or, that in conductors R and R' connected to source 50) at the second predetermined value and at a third predetermined value. Normally, the third predetermined value (e.g., 40 ma) is greater than the first predetermined current value established by constant current and voltage source 30, and the second predetermined value (e.g., 18 ma) is less than the second threshold value sensed by clock enable and reset logic circuit 32. Normally, source 50 functions to regulate the loop current at the third predetermined value, and functions to regulate the loop current at the second predetermined value in response to a signal on lead 52B from timing circuit 52.

Timing circuit 52 may comprise a conventional monostable multivibrator chain which functions to provide a plurality of successive output signals, as follows. In response to loop current in line L1 flowing as a result of the application of the constant current and voltage source 30 thereto, timing circuit 52 begins timing at time T0. Thereafter, timing circuit 52 provides: an output signal on lead 52B at time T2; and an output signal on lead 52A at time T5, if the strap connection is for PARTY 2, at time T7 if the strap connection is for PARTY 3, at time T9 if the strap connection is for PARTY 4, and at time T11 if the strap connection is for PARTY 5.

As examples, the following times from time T0 may be established:

T1—40ms; T2—50ms;
T3—61ms; T4—66ms;
T5—73ms; T6—81ms;
T7—90ms; T8—99ms;
T9—111ms; T10—120ms;
T11—135ms; T12—150ms.

Assuming now that a long-distance call has been initiated at one of the PARTY 1–PARTY 5 stations interconnected with line L1, the provision of a START GROUND signal by register sender 18 actuates both disconnect timer 34 and the clock enable and reset logic circuit 32. The resultant energization of relay K1 causes the normally-open contacts K1A, K1B thereof to close, thereby coupling the constant current and voltage source 30 to the conductors TR of line L5 (and accordingly, to line L1). Substantially simultaneously, clock enable and reset logic circuit 32 provides an output signal on lead 32C to reset the counters within circuit 36. When the loop current in line L5 (and line L1) has risen to a level greater than the first minimum threshold value established by clock enable and reset logic circuit 32, e.g., 13 ma, clock enable and reset logic circuit 32 removes the signal from lead 32C, thereby allowing the counters within 36 to be stepped by the clock pulses on lead 38A. This time is substantially coincident with time T0 in FIG. 4.

Thereafter, the loop current in line L5 (and L1) is regulated at the first predetermined value (e.g., 30 ma) for a time sufficient to allow all reactances associated with the lines interconnecting the calling station and the automatic party identifier 20 to become fully charged so that a reference set of signal conditions is therefore established on those lines for the later detection of a response from the calling station. As seen in FIG. 4, the loop current starts at some arbitrary value at time T0 and eventually stabilizes at the first predetermined value at a time before time T1.

Assuming now that the call has been initiated from the PARTY 1 station, which has no subscriber module 12 in circuit therewith, an output signal is provided at the automatic party identifier 20 by circuit 36 on lead 36B at time T1 which causes the constant current and voltage source 30 to switch to its second state wherein it thereafter maintains across the line L5 (and therefore across line L1) a constant voltage whose level is equal to that required to maintain the first, predetermined value of loop current at the time of switching. At this time, and thereafter, the loop current will remain at the first predetermined value (e.g., 30 ma) inasmuch as only the telephone instrument 10 is in circuit with the line L1 at the PARTY 1 station and inasmuch as the lines have been fully charged at time T1.

At time T3, circuit 36 provides an output signal on lead 36A which causes clock enable and reset logic circuit 32 to begin monitoring for loop current greater than the second threshold value, e.g., 25 ma. Simultaneously, an output signal is provided on lead 36C1 to output driver circuit 40. Since the loop current is at the first predetermined value, which is greater than the second threshold value, clock enable and reset logic circuit 32 provides an output signal on lead 32B to gate on output driver circuit 40 which thereby provides the PARTY 1 output signal therefrom. Since the output signal on lead 36C1 persists until time T4, a "window" is established between times T3 and T4 for detecting loop current in excess of the second threshold value, with the location of the window being unique to the PARTY 1 station.

Assuming now that the long-distance call has been placed from one of the PARTY 2 – PARTY 5 stations, the application of the reverse polarity voltage from the constant current and voltage source 30 to line L5 (and to line L1) at time T0 causes the diode D1 in that one of the subscriber modules 12 in circuit with the telephone instrument 10 that has gone off-hook to become reverse-biased and therefore non-conductive. Normally, diode D1 is conductive with the application of the normal polarity, central office battery and provides a low impedance shunt around the subscriber module 12 so that dial pulsing and voice transmission from the telephone instrument 10 are not affected.

When diode D1 is not conductive, however, the voltage therefore applied to the remainder of the subscriber module 12 causes timing circuit 52 to begin its timing function and constant current source 50 seeks to regulate the loop current in line L1 and thus L5 at the third predetermined value (e.g., 40ma), with the voltage across the subscriber module 12 being substantially regulated at the voltage established by zener diode ZD1, which, for example, may be 6.2 volts. As has been previously described, the loop current at this time is being regulated at the first predetermined value by the constant current and voltage source 30 and thus the constant current source 50 is essentially a short circuit so that the subscriber module 12 appears to the line L1 as a low impedance, constant voltage load (that provided by zener diode ZD1) to help establish the loop current at the first, predetermined value.

At time T2, or, after the time T1 at which the constant current and voltage source 30 is switched to its constant voltage mode, the timing circuit 52 provides an output on lead 52B so that the constant current source 50 switches to regulating the loop current at the second predetermined value, e.g., 18 ma. This second predetermined value must be chosen below the second threshold value of loop current established as a detection level for current level detector 32'. Preferably, the second predetermined value must not be low enough to signify to the central office than an on-hook condition exists and that the calling station should be disconnected, but yet must be sufficiently below the second threshold value to provide an acceptable signal-to-noise ratio for the response of the subscriber module 12.

At time T3, the circuit 36 provides an output on lead 36C1. Since the loop current is at this time being regulated at the second predetermined value, e.g., 18 ma, no output is provided by clock enable and reset logic circuit 32 on lead 32A and accordingly output driver circuit 40 does not provide the PARTY 1 output. At time T4, circuit 36 provides an output signal on lead 36C2 and removes the signal on lead 36C1. If the calling station is strapped for PARTY 2 identification, timing circuit 52 thereafter provides an output signal on lead 52A at time T5, thereby placing SCR1 in a conductive state to provide a shunt across the remainder of the subscriber module 12 and, particularly, the constant current source 50. As a result, the loop current begins to rise to the first predetermined value, e.g., 30 ma, due to the voltage established by constant current and voltage source 30. When the loop current exceeds the second threshold value, e.g., 25 ma, clock enable and reset logic circuit 32 provides an output signal on lead 32A which, in conjunction with the still-existing output signal on lead 36C2, causes output driver circuit 40 to provide the PARTY 2 output signal. At time T6, circuit 36 provides an output signal on lead 36C3 and removes the output signal from lead 36C2.

It will therefore be appreciated that a window is established from times T4 to T6, for detection of a rise in loop current signifying that the calling party has a PARTY 2 station identification. As will also be appreciated by those skilled in the art, successive outputs on leads 36C3, 36C4, 36C5 and 36C6 respectively establish PARTY 3, PARTY 4 and PARTY 5 windows, during times T6–T8, T8–T10, and T10–T12, for detection of responses comprising a rise in loop current above the second predetermined value as a result of the operation of the timing circuit 52 in the subscriber module 12 associated with the station at which the call is placed at times T7, T9 or T11. Therefore, the PARTY 3 – PARTY 5 output signals from output driver circuit 40 can also be provided.

At the same time that the party identification is provided by enabling the output driver circuit 40 with the signal on lead 32A, the signal on lead 32B disables the counters within counter and decoder circuit 36 from being stepped by the clock pulses on lead 38A. Therefore, the PARTY 1 – PARTY 5 output signals are maintained until the removal of the START GROUND signal.

If the loop current does not at any time exceed the second threshold value after clock enable and reset logic circuit 32 removes its output signal from lead 32C, which could occur if the source 30 failed, if the subscriber module 12 in the calling station failed, or if the telephone instrument 10 therein went to an on-hook condition as a result of the subscriber hanging up, then the output signal on lead 36C6 from circuit 36 at time T12 causes the output driver circuit 40 to provide the DISCONNECT output signal. Likewise, if the loop current does not at any time exceed the first, minimum threshold value, e.g., 13 ma, established by clock enable and reset logic circuit 32, then the output signal on lead 34A from the disconnect timer 34 at the end of its predetermined time interval also serves as a DISCONNECT output signal. In response, register sender 18 returns the line splitting circuit 16 to its normal condition by opening contacts 16B and 16C and closing contacts 16A, whereupon the disconnected status of the stations can be sensed by the central office to open the line circuit 14, or, if such disconnect status does not exist, to provide an alarm indication of subscriber module failure.

Upon provision of any of the PARTY 1 – PARTY 5 or DISCONNECT output signals to the register sender 18, the register sender 18 removes the START GROUND signal from the automatic party identifier 20. In response thereto, the disconnect timer 34 is deactuated, thereby deenergizing relay K1 to open the contacts K1A, K1B thereto to disconnect the automatic party identifier 20 from the line L5.

It will be appreciated by those skilled in the art that a subscriber module 12 can also be placed in circuit with the telephone instrument 10 at the PARTY 1 station to provide a positive indication of PARTY 1 status, and that parties additional to PARTY 5 can also be identified by provision successive "windows" for the responses of the subscriber modules therein.

The choice of the first, second and third predetermined values of loop current, and the first and second threshold values thereof, is governed by many factors, of which the following are important. A first design consideration is that the system utilize a set of signal conditions unique to that system so that known central office equipment will not respond to that set of signal conditions in any manner. A second design consideraion is that the system have a signal-to-noise ratio in the set of signal conditions that is as high as possible to permit reliable detection of calling parties.

As can be appreciated by those skilled in the art, the interrogation in the system is achieved by establishing the first predetermined value of loop current, and a response is achieved by thereafter limiting the loop current to the lower, second predetermined value thereof and allowing the loop current to return to the first predetermined value at a predetermined time unique to the calling station.

Therefore, the signal-to-noise ratio can be increased by increasing the difference between the first and second predetermined values of loop current. For example, the second predetermined value of loop current could be lowered from the 18 ma value previously discussed to zero. In such a case, a loop current sensing relay monitoring the line at the central office would release when the called party answered the telephone call, which release would erroneously indicate that the calling party has placed its telephone instrument on-hook. The release of the loop current sensing relay will in many central offices cause the line relay to disconnect, thereby terminating the connection of the calling party to the called party even though in fact the calling party has not gone on-hook.

At the present time, loop current sensing relays commonly used in central offices have a minimum or drop-out current of approximately 11 ma. As a practical matter, many of these loop current sensing relays are out of adjustment and therefore many release for loop currents up to 16 ma. Accordingly, 18 ma was chosen as the second predetermined value so as to be sufficiently above 16 ma to account for normal circuit tolerances and to insure that the worst case loop current sensing relays will not release. It should also be apparent that current regulation at the second predetermined value, such as provided by the constant current source 50, is desirable to insure that the current remains at that value rather than possibly dropping to a value which would release a loop current sensing relay.

As another example, the first predetermined value of loop current could be significantly raised above the 30 ma value previously described. However, for very long lines, including those with loop extenders, diode bridges, and the like, the impedance of the line may be such that the voltage applied to the line by the automatic party identifier 20 (by the source 30) must be in excess of 100 VDC to achieve a loop current of 30 ma. Therefore, substantially higher voltages would be required to achieve even higher loop currents, which higher voltages would not be compatible with those typically available and used in central offices.

It will also be appreciated by those skilled in the art that current regulation at the first predetermined value is desirable. If current regulation were not so provided, the application to the line of a voltage having a magnitude necessary to produce an acceptable loop current value on very long lines, e.g. 30 ma, would result in substantially higher currents being encountered upon the application of such a voltage to short lines.

It also should be noted that the constant current source 50 in each subscriber module 12 is normally inoperative, inasmuch as it seeks to regulate the loop current at the third predetermined value, e.g., 40 ma, which is higher than the first predetermined value established during that time by the constant current and voltage source 30 in the automatic party identifier 20. However, during the initial period from time T0 to time T1 during which the loop current is settling to the first predetermined value, excessive loop currents may occur at the subscriber module 12 which should be limited to avoid any problems resulting therefrom.

As previously discussed, the first, minimum threshold value of loop current detected by current level detector 32' is simply chosen to reflect the fact that the constant current and voltage source 30 has applied a voltage to the line.

The second threshold value detected by current level detector 32' ideally should be just below the first predetermined value of loop current to achieve a high signal-to-noise ratio. Because of normal circuit tolerances which may result in the loop current actually being regulated at some value below the first predetermined value during times T0 - T2, the second threshold value was chosen to be 25 ma.

The specific times T1, T2, etc. previously described are also arrived at to achieve reliable party identification for all lines with which the present invention may be utilized while yet achieving that identification in as short a time as possible. If the times are significantly extended beyond those previously stated, the subscriber might notice and object to the time interval that it took for his long distance call to be placed inasmuch as the actual voice transmission on the call cannot start until the automatic party identifier 20 provides the PARTY CODE signal to register sender 18 which thereafter releases the line splitting circuit 16. On the other hand, the times cannot be significantly reduced since telephone lines are highly reactive and therefore a certain amount of time is necessary to establish the initial set of signal conditions on the line, e.g., the first predetermined value of loop current, so that a response back from the subscriber module 12 is precise both in value and in time, especially for telephone lines of medium to long length. However, it is presently anticipated that the times previously stated could be cut in half and still achieve acceptable results for most telephone lines.

As previously discussed, and as discussed in more detail hereinafter with respect to the specific circuitry illustrated in FIG. 5, the constant current and voltage source 30 applies a voltage to the line which is isolated from earth ground. if the constant and current voltage souce 30 were not so isolated, the current level detector 32' would be susceptible to longitudinal currents in the conductors TR of line L5. Typically, longitudinal currents are those induced from adjacent power conductors and are pick-up in phase in both the conductors TR. Loop current, on the other hand, is out of phase on the conductors TR. Accordingly, the current level detector 32', in the case where a nonisolated supply were used, would have to include circuitry for differenentiating between out of phase signals (loop currents) and in-phase signals (longitudinal currents), with a consequent increase in the complexity and criticality of its circuitry.

It should also be noted that the constant current and voltage source 30, at time T1, switches to regulating the voltage across the line so as to allow the subscriber module 12 to thereafter regulate loop current but to maintain on the line a set of signal conditions that permits the loop current to return to the first predetermined value at the time (T5, T7, T9, or T11) that the subscriber module 12 terminates its current regulation to signify a response to the interrogation.

Finally, the low impedance of the subscriber module 12 during times T0–T1 is desirable to allow fast charging of the line by the constant current and voltage source 30 so that the first predetermined value of loop current may be achieved as soon as possible. As previously described, this low impedance is afforded by the fact that substantially only the zener diode ZD1 is in circuit with the line during the times T0–T1, except for the instance where the loop current goes above the third predetermined value established by constant current source 50. The impedance of the subscriber module 12 afforded by zener diode ZD1 is also low enough to avoid significant reductions in ringing signals applied to the line when the subscriber station in which the subscriber module 12 is located is being called (inasmuch as ringing signals are AC and accordingly half cycles thereof will pass through zener diode ZD1 and constant current source 50, with the other half-cycles passing through diode D1).

From this discussion, those skilled in the art will accordingly recognize that the method of the present invention, in its simplest form, may be practiced by applying at the central office a voltage to the telephone line which has a magnitude sufficient to establish the first predetermined value of loop current which of course is greater than the value of loop current signifying an on-hook condition on the telephone line, and by causing the loop current to change from this first predetermined value in a manner unique to the calling party station. Although the change preferably is time-related, and in fact may comprise a single "pulse" in which loop current is limited to the second predetermined value for a time unique to the calling party station, the change may also comprise a sense of pulses which are asynchronously caused to occur and which contain within information sufficient to identify the calling party station.

In all cases, the central office provides party identification by comparing the loop current change that occurs (or, the absence of any loop current change) with a plurality of stored loop current changes each unique to one party station.

Figure 5:
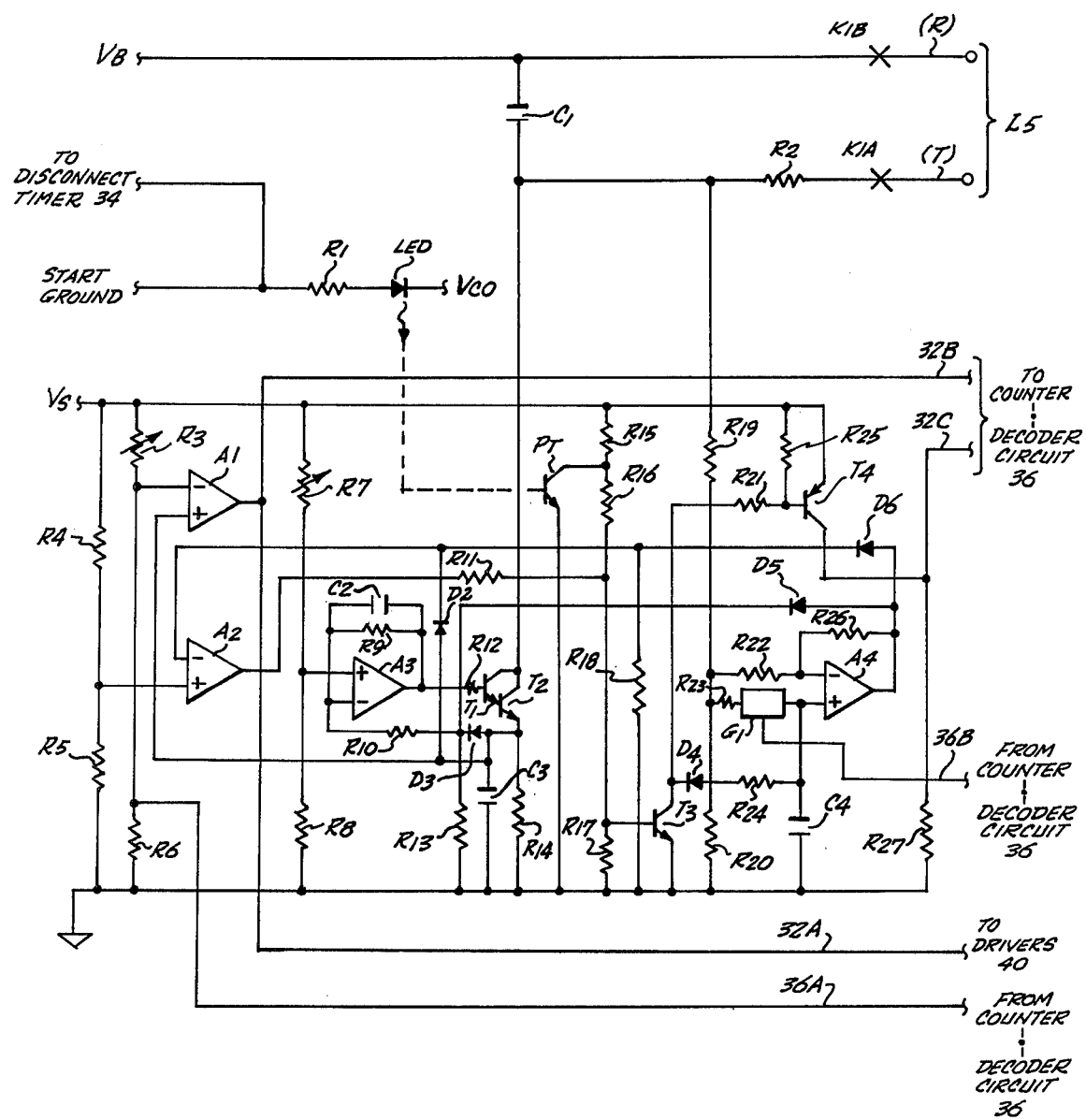
FIG. 5 is a schematic diagram illustrating a preferred embodiment of a portion of the automatic party identifier of FIG. 2.

Referring now to the specific embodiment in FIG. 5, a connection is made from the conductor R of line L5 through normally-open contacts K1B, capacitor C1, a resistor R2, and normally-open contacts K1A to the conductor T thereof. Potential $V_B$ is connected to the common junction of contact K1B and capacitor C1, with the conductor T being referenced to an isolated ground potential through the circuitry illustrated by connections to the common junction of capacitor C1 and resistor R2. The common junction of capacitor C1 and resistor R2 is connected to a current and voltage regulating circuit comprising the collector-to-emitter paths of a pair of Darlington-connected transistors T1, T2 and parallel-connected resistor R14 and capacitor C3 which are in turn connected to isolated ground potential. The common junction of capacitor C1 and resistor R2 is also connected to a voltage sensing circuit comprising resistors R19 and R20 which are connected in series to isolated ground potential.

The common junction of resistors R19 and R20 has appearing thereon a signal proportional to line voltage and is connected through a resistor R23 to the input of a normally-open gate circuit G1 and through a resistor R22 to the inverting input of an operational amplifier A4. A signal output of gate circuit G1 is connected to the non-inverting input of operational amplifier A4 and through a capacitor C4 to isolated ground potential. The lead 36B from the counter and decoder circuit 36 is connected to the gating signal input of gate circuit G1.

Operational amplifier A4 is connected as a comparator, with a resistor R26 providing positive feedback between the output and inverting input thereof. The output of operational amplifier A4 is connected via a diode D5 to the common junction of a diode D3 and a resistor R10, and via a diode D6 to the inverting input of an operational amplifier A2, with resistor R18 being connected from the inverting input of operational amplifier A2 to isolated ground potential. A resistor R13 connects the common junction of diode D3 and resistor R10 to isolated ground potential.

The non-inverting input of operational amplifier A2 is supplied with a signal from the common junction of resistors R4 and R5 connected in series between the supply potential $V_s$ and isolated ground potential, with the signal thereby being provided to the non-inverting input being representative of the first, minimum threshold value at which it is desired to start the operation of the automatic party identifier 20, e.g., 13 ma. The output of operational amplifier A2 is connected via a connector R11 to the common junction of series-connected resistors R16 and R17, with resistor R16 being connected through a resistor R15 to the supply potential $V_s$ and with resistor R17 being connected to isolated ground potential.

The potential $V_{co}$ (which may be obtained from the central office battery) is coupled through a light emitting diode LED forming a first part of an optical isolator and a resistor R1 to the terminal upon which the START GROUND signal from the register sender 18 appears. A photo-transistor PT forming a second part of the optical isolator has its collector-to-emitter path connected from the common junction of resistors R15 and R16 to isolated ground potential. A common junction of resistors R16 and R17 is connected to the base of a transistor T3 whose emitter is connected to ground potential and whose collector is connected through a resistor R21 to the base of a transistor T4 and through series-connected diode D4 and resistor R24 to the common junction of capacitor C4 and the non-inverting input of operational amplifier A4. The supply potential $V_s$ is connected to the base of transistor T4 through a resistor R25 and directly to the emitter of transistor T4. The collector of transistor T4 is connected to the output lead 32C going to the counter and decoder circuit 36, with a resistor R27 coupling lead 32C to isolated ground potential.

The common junction of capacitor C3, resistor R14, and the emitter of the Darlington-connected transistor pair T1, T2, has appearing thereon a signal proportional to the loop current and is connected through series-connected diode D3 and resistor R10 to the inverting input of an operational amplifier A3. Parallel-connected capacitor C2 and resistor R9 provide negative feedback from the output of operational amplifier A3 to the inverting input thereof, with the output of operational amplifier A3 being coupled through a resistor R12 to the base of the Darlington-connected transistor pair T1, T2. The non-inverting input of operational amplifier A3 is connected to the common junction of series-connected resistors R7 and R9, with the resistor R7 being connected to the supply potential $V_s$ and resistor R8 being connected to isolated ground potential. Resistor R7 is adjustable to set the first predetermined value of loop current, e.g, 30 ma.

The inverting input of operational amplifier A1 is connected to the common junction of resistors R3 and R6, with resistor R3 being connected to the supply potential $V_s$ and resistor R6 being connected to isolated ground potential. Resistor R3 is adjustable to set the second threshold value detected by current level detector 32', e.g., 25 ma. The output lead 36A from the counter and decoder circuit 36 is also connected to the inverting input of operational amplifier A1. The output of operational amplifier A1 has connected thereto the output lead 32B going to the counter and decoder circuit 36, and the output lead 32A going to the output driver circuit 40.

In operation, the provision of the START GROUND signal by the register sender 18 at time T0 causes energization of relay K1 in disconnect timer 34, thereby closing contacts K1A and K1B, and accordingly applying the potential $V_B$ to the line L5. Simultaneously, the START GROUND signal completes a circuit from $V_{co}$ through the light emitting diode LED of the optical isolator, thereby turning on the phototransistor PT thereof to shunt resistors R16 and R17 to isolate ground potential. At this time, however, transistor T3 is maintained on by a signal supplied from operational amplifier A2 through resistor R11, thereby providing a shunt discharge path to isolated ground potential through resistor R24 and diode D4 for any charge remaining on capacitor C4. When transistor T3 is on, transistor T4 is also on which accordingly applies the supply potential $V_s$ across resistor R27, thereby providing a signal on lead 32C to counter and decoder circuit 36 to reset the counters therein.

Upon application of the potential $V_B$ to line L5, loop current flows in line L5 and the magnitude thereof is represented by the loop current signal appearing at the common junction of the capacitor C3, resistor R14, and the emitter of Darlington-connected transistor pair T1, T2. When the loop current signal, as coupled to the inverting input of operational amplifier A3 through diode D2, exceeds the first, minimum threshold value appearing at the common junction of the resistors R4 and R5 and coupled to the non-inverting input of operational amplifier A2, amplifier A2 removes its signal from transistor T3 to turn off transistor T3 and accordingly turn off transistor T4. When transistor T4 turns off, the reset signal provided thereby on lead 32C is removed, thereby allowing the counters within counter and decoder circuit 36 to begin counting the clock pulses from clock 38.

The loop current signal also flows through diode D3 and resistor R13 to develop a signal proportional thereto which is applied through resistor R10 to the inverting input of operational amplifier A3. The regulation of loop current at the first predetermined value, e.g. 30 ma, is then achieved by operational amplifier A3 controlling the conduction of the Darlington-connected transistor pair T1, T2 by comparing the actual loop current value with the first predetermined value established at the common junction of resistors R7 and R8 and coupled to the non-inverting input of operational amplifier A3.

At time T1, counter and decoder circuit 36 provides the momentary output signal on lead 36B which closes gate G1 for the duration thereof. The voltage signal appearing at the common junction of resistors R19 and R20 is then coupled through resistor R23 and gate G1 to charge capacitor C4 to a voltage representative of the voltage across line L5 at the time T1, which of course is that voltage required to produce the first predetermined value of loop current therein. Since transistor T3 is turned off, capacitor C4 cannot discharge and thereafter stores therein this voltage value. When the momentary output signal on lead 36B is removed, gate G1 is again opened and operational amplifier A4 thereafter compares the actual voltage on line L1, as represented by the signal coupled to its inverting input through resistor R22, with the stored voltage value contained in capacitor C4 and provides an output signal which is coupled through diode D5 to develop a control signal across resistor R13. The control signal across resistor R13 reverse-biases diode D3 so that the loop current signal appearing at the common junction of capacitor C3, resistor R14 and the emitter of the Darlington-connected transistor pair T1, T2 can no longer be provided to operational amplifier A3. The control signal is coupled through resistor R10 to the inverting input of operational amplifier A3 which functions to control the conduction of the Darlington-connected transistor pair T1, T2. Since the signal applied to the non-inverting input of operational amplifier A3 from the common junction of resistors R7 and R8 is constant, it will be appreciated that the Darlington-connected transistor pair T1, T2 is thereafter controlled to maintain the voltage in the line L1 at the value stored in capacitor C4. The output signal from operational amplifier A4 also is coupled through diode D6 to the inverting input of operational amplifier A2 to maintain the non-conduction of transistors T3 and T4.

At time T2, the timing circuit 52B provides an output signal on lead 52B to cause the constant current source 50 to regulate the loop current at the second predetermined value, e.g., 18 ma.

At time T3, the counter and decoder circuit 36 provides an output signal on lead 36A which thereafter permits the signal present at the common junction of resistors R3 and R6, and coupled to the inverting input of operational amplifier A1, to be representative of the second threshold value, e.g., 25 ma. When the loop current signal coupled to the inverting input of operational amplifier A1 rises to a value equal to or greater than the second threshold value, operational amplifier A1 provides an output signal which is coupled through lead 32B to inhibit the counters within counter and decoder circuit 36 and which is coupled through lead 32A to enable one of the drivers within output driver circuit 40. As previously discussed, the time at which operational amplifier A1 provides its output signal is indicative of the party identification of the party making the long-distance telephone call.

When the START GROUND signal is removed by register sender 18, the phototransistor PT becomes non-conductive to remove the shunt across resistors R16 and R17, thereby turning on transistors T3 and T4 (since the loop current has dropped below the first threshold value due to opening of contacts K1A, K1B).

While the invention has been describes with respect to a preferred embodiment, it is to be clearly understood by those skilled in the art that the invention is not limited thereto, but rather is intended to be interpreted only in accordance with the following claims.

What is claimed is:

1. A method for automatically identifying at a central office that one of a plurality of party stations interconnected with the telephone line from which a telephone call has been placed, said method comprising the steps of:

(a) at the central office, applying to the telephone line a voltage having a magnitude sufficient to produce a first predetermined value of loop current in the telephone line;

(b) at that one party station, responding to said voltage by initially regulating the value of said loop current at a second predetermined value, said second predetermined value being smaller than said first predetermined value but greater than a value of said loop current that would signify to the central office that an on-hook condition exists on the telephone line, and subsequently terminating said regulation after the passage of a predetermined time from the application of said voltage, said predetermined time being unique to that one party station, whereby the value of said loop current rises from said second predetermined value toward said first predetermined value; and (c) at the central office, detecting said rise in the value of said loop current and comparing the time occurrence of said detected rise in loop current with a plurality of predetermined time intervals to provide identification of that one party station, each said predetermined time interval being subsequent to the application of said voltage and being unique to one party station interconnected with the telephone line.

2. A method as recited in claim 1, further comprising the step of regulating, at the central offce, the magnitude of said voltage applied thereto at said magnitude sufficient to provide said first predetermined value of loop current.

3. A method as recited in claim 1,
wherein step (a) further comprises the sub-steps of:
(i) from a first time, substantially coincident with the detection of the placement of the telephone call, to a second time, regulating the value of said loop current at said first predetermined value, and
(ii) at said second time and thereafter, regulating the magnitude of said voltage applied to the telephone line at said magnitude sufficient to produce said first predetermined value of loop current;

wherein step (b) comprises the sub-steps of:
(i) at a third time, subsequent to said second time, regulating the value of said loop current at said second predetermined value; and
(ii) at a fourth time, subsequent to said third time and unique to that one party station; terminating said sub-step (i) of step (b) of regulating the value of said loop current; and wherein said step (c) comprises the sub-steps of:
(i) at a fifth time, subsequent to said third time, monitoring the telephone line to detect a rise in the value of said loop current toward said first predetermined value thereof; and
(ii) comparing the time occurrence of said detected rise in said loop current with said plurality of predetermined time intervals each unique to a party station to provide identification of that one party station.

4. A method as recited in claim 3, wherein said step (c) substep (i) detects said rise in loop current only when the value of said loop current equals or exceeds a threshold value of said loop current intermediate said first and second predetermined values thereof.

5. A method as recited in claim 4, wherein said first predetermined value is substantially equal to 30 milliamps, wherein said second predetermined value is substantially equal to 18 milliamps, and wherein said threshold value is substantially equal to 25 milliamps.

6. A method as recited in claim 4, for identification of four party stations interconnected with the telephone line, wherein said second time is substantially equal to 40 milliseconds, wherein said third time is substantially equal to 50 milliseconds, wherein said fifth time is substantially equal to 61 milliseconds, wherein said fourth times for said four party stations are respectively 73 milliseconds, 90 milliseconds, 111 milliseconds, and 135 milliseconds, and wherein corresponding ones of said predetermined time intervals are 66–81 milliseconds, 81–99 milliseconds, 99–120 milliseconds, and 120–150 milliseconds.

7. A method as recited in claim 3,
wherein step (b) further comprises the sub-steps of:
(iii) at a particular one of said plurality of party stations, allowing the value of said loop current to remain at said first predetermined value from said third time to said fourth time; and
wherein step (c) sub-step (ii) additionally monitors the telephone line during a time preceding any of said predetermined time intervals and subsequent to said fifth time to detect said first predetermined value of loop current to provide identification of said particular party station.

8. A method as recited in claim 3, wherein said first predetermined value is substantially equal to 30 milliamps, and wherein said second predetermined value is substantially equal to 18 milliamps.

9. A method as recited in claim 3 for identification of four party stations interconnected with the telephone line, wherein said second time is substantially equal to 40 milliseconds, wherein said third time is substantially equal to 50 milliseconds, wherein said fifth time is substantially equal to 61 milliseconds, wherein said fourth times for said respective party stations are 73 milliseconds, 90 milliseconds, 111 milliseconds, and 135 milliseconds, and wherein corresponding ones of said plurality of predetermined time intervals are 66–81 milliseconds, 81–99 milliseconds, 99–120 milliseconds, and 120–150 milliseconds.

10. A method as recited in claim 3, wherein the time separation between said first and said second times during which regulating of said loop current at said first predetermined value occurs is sufficient to allow all reactances associated with the telephone line to become fully charged so that the value of said loop current has stabilized at said first predetermined value by said second time.

11. A method as recited in claim 3, wherein said voltage has a polarity opposite to that normally applied to the telephone line by the central office battery.

12. A method as recited in claim 1, wherein said voltage has a polarity opposite to that normally applied to the telephone line by the central office battery.

13. An automatic party identifier useful in conjunction with and forming part of an apparatus for detecting which party on a multiparty telephone line has placed a call thereon, said automatic party identifier comprising:
(a) a voltage source;
(b) means for selectively interconnecting said voltage source with the telephone line when party identification is to be made to thereby apply to the telephone line a voltage having a magnitude sufficient to produce a first predetermined value of loop current therein;
(c) means for regulating loop current in the telphone line at said first predetermined value, and for alternately regulating the magnitude of the voltage applied to the telephone line by said voltage source at said magnitude sufficient to produce said first predetermined value of loop current therein;
(d) timing means for producing a plurality of timing signals, a first one of said plurality of timing signals controlling said regulating means so that said regulating means regulates said loop current for a predetermined period of time sufficient to stabilize said loop current at said first predetermined value, and so that said regulating means thereafter regulates the magnitude of said voltage applied to the telephone line;

(e) current level detector means providing a current level signal representative of said loop current;

(f) threshold means responsive to a second one of said plurality of timing signals to compare, at a time subsequent to said predetermined period of time, said current level signal with a threshold value of said loop current, said threshold value being lower than said first predetermined value, but higher than a second predetermined value which is greater than the value of said loop current that would signify an on-hook condition on the telephone line, said threshold means providing an output signal when said loop current equals or exceeds said threshold value;

(g) decoder means responsive to a third one of said plurality of timing signals to provide a plurality of successive signals each existing during succeeding time intervals, each succeeding time interval being unique to one of the parties on the multi-party telephone line, and (h) output means responsive to concurrence of said output signal from said threshold means and one of said successive signals to provide a party identification signal.

14. An automatic party identifier as recited in claim 13, wherein said means for selectively interconnecting said voltage source includes disconnect timer means for disconnecting said voltage source from the line at a time subsequent to the last one of said plurality of successive signals.

15. An automatic party identifier as recited in claim 13, wherein the last one of said plurality of successive signals provided by said decoder means is not associated with any party, and wherein said output means provides a disconnect signal in response to said last one of said plurality of successive signals.

16. An automatic party identifier as recited in claim 13, wherein said voltage source is isolated from earth ground.

17. A subscriber module useful in conjunction with and forming part of an apparatus for detecting which party on a multiparty telephone line has placed a call thereon, said subscriber module including:

(a) first and second terminals adapted to be connected in series circuit with the telephone line;

(b) first means connected between said first and second terminals for shunting current therebetween in a first predetermined direction of said current;

(c) second means connected between said first and second terminals for controlling current therebetween in a second direction of said current which is opposite to said first direction, said second means including:

(i) timing means responsive to the detection of current in said second direction for providing a plurality of successive timing signals, (ii) current regulating means for regulating the magnitude of said current in said second direction at a predetermined value which is greater than the magnitude of said current that would signify an on-hook condition on the telephone line, said current regulating means initiating said current regulation in response to a first one of said plurality of timing signals and terminating said current regulation in response to a second, subsequent one of said plurality of timing signals, and (iii) means selectively shunting current between said first and said second terminals in said second direction in response to said second one of said plurality of timing signals.

18. A subscriber module as recited in claim 17, wherein said first one of said plurality of timing signals is provided at a predetermined time after detection of said current in said second direction.

19. A subscriber module as recited in claim 17, wherein said timing means includes means for selecting the time at which said timing means provides said second one of said plurality of timing signals.

20. A subscriber module as recited in claim 17, wherein said first means comprises a diode, wherein said means selectively shunting current in said second direction comprises a controllable semiconductor device having first and second current-conducting terminals respectively connected to said first and second terminals, and also having a gating terminal having said second one of said plurality of timing signals applied thereto, and further comprising a zener diode in series circuit with said current regulating means across said first and said second terminals, and means coupling a common junction of said zener diode and said current regulating means to said timing means to provide a signal, upon the flow of current in said second direction, to said timing means to initiate the operation thereof.

21. A subscriber module useful in conjunction with and forming part of an apparatus for detecting which party on a multiparty telephone line has placed a call thereon, said subscriber module including:

(a) first and second terminals adapted to be connected in series circuit with the telephone line; and (b) means connected between said first and second terminals for controlling current therebetween in a predetermined direction of said current, said means including:

(i) timing means responsive to the detection of current in said predetermined direction for providing a plurality of successive timing signals, (ii) current regulating means for regulating the magnitude of said current in said predetermined direction at a predetermined value which is greater than the magnitude of said current that would signify an on-hook condition on the telephone line, said current regulating means initiating said current regulation in response to a first one of said plurality of timing signals and terminating said current regulation in response to a second, subsequent one of said plurality of timing signals, and (iii) means selectively shunting current between said first and said second terminals in said predetermined direction in response to said second one of said plurality of timing signals.

22. A subscriber module as recited in claim 21, wherein said first one of said plurality of timing signals is provided at a predetermined time after detection of said current in said predetermined direction.

23. A subscriber module as recited in claim 21, wherein said timing means includes means for selecting the time at which said timing means provides said second one of said plurality of timing signals.

24. A subscriber module as recited in claim 21, wherein said means selectively shunting current in said predetermined direction comprises a controllable semiconductor device having first and second current-conducting terminals respectively connected to said first and second terminals, and also having a gating terminal having applied thereto said second one of said plurality of timing signals, and further comprising a zener diode in series circuit with said current regulating means across said first and said second terminals, and means coupling a common junction of said zener diode and said current regulating means to said timing means to provide a signal, upon the flow of current in said predetermined direction, to said timing means to initiate the operation thereof.

25. An apparatus for providing, at a central office, a party identification signal identifying that one of a plurality of party stations, interconnected with a telephone line, from which a telephone call has been placed, and wherein the central office includes means for providing an enabling signal in response to the detection of placement of a call on the telephone line and for removing the enabling signal upon provision of said party identification signal, said apparatus comprising:
 (a) an automatic party identifier for location at the central office;
 (b) means interconnecting said automatically party identifier with the telephone line in response to and for the duration of said enabling signal;
 (c) first means within said automatic party identifier for applying to the telephone line a voltage having a magnitude sufficient to produce a first predetermined value of loop current in the telphone line;
 (d) a plurality of subscriber modules, each of said plurality of subscriber modules being adapted to be located in circuit with one of said plurality of party stations in the telephone line and responding to said voltage by initially regulating the value of said loop current at a second predetermined value, said second predetermined value being smaller than said first predetermined value but being greater than the value of said loop current that would signify to the central office that an on-hook condition exists on the telephone line, and by subsequently terminating said regulation after the passage of a predetermined time from the application of said voltage, said predetermined time being unique to that one party station, whereby the value of said loop current rises from said second predetermined value toward said first predeterined value;
 (e) second means within said automatic party identifier for providing an output signal when the value of said loop current equals or exceeds a threshold value intermediate said first and said second predetermined values thereof;
 (f) third means within said automatic party identifier which is responsive to said first and seond means thereof for providing said party identification signal identifying a particular one of said plurality of party stations upon concurrence of said output signal and any one of a plurality of predetermined time intervals, each said predetermined time interval being subsequent to the application of said voltage and being unique to and therefore representative of one of said party stations.

26. An apparatus as recited in claim 25, wherein said automatic party identifier further includes fourth means for regulating the magnitude of said voltage applied to the telephone line at said magnitude sufficient to produce said first predetermined value of said loop current therein.

27. An apparatus as recited in claim 25, wherein each said subscriber module includes means for maintaining the value of said loop current at said second predetermined value, and module timing means responsive to the application of said voltage for inhibiting, at said predetermined time, the operation of said means for maintaining loop current.

28. An apparatus as recited in claim 27, wherein said automatic party identifier further includes fourth means for regulating the value of said loop current at said first predetermined value from a first time, substantially coincident with the application of said voltage to the telephone line, to a second time which is sufficient to allow reactances associated with the telephone line to become fully charged so that said loop current stabilizes at said first predetermined value thereof, and for thereafter regulating the magnitude of said voltage applied to the telephone line at said magnitude sufficient to produce said first predetermined value of loop current therein; and wherein each said module timing means is responsive to the application of said voltage to the telephone line for inhibiting the operation of said means for maintaining loop current until a third time, subsequent to said second time, and for again inhibiting the operation of said means for maintaining loop current at said predetermined time and subsequent to said third time.

29. An apparatus as recited in claim 25, wherein said plurality of subscriber modules are adapted to be placed in circuit with all but one of said plurality of party stations.

* * * * *

UNITED STATES PATENT AND TRADEMARK OFFICE
CERTIFICATE OF CORRECTION

PATENT NO. : 4,099,031

DATED : July 4, 1978

INVENTOR(S) : D. Frederic Proctor et al.

It is certified that error appears in the above-identified patent and that said Letters Patent are hereby corrected as shown below:

Column 1, line 41: "238" is changed to --2--.

line 52: "applied" is changed to --applies--.

Column 3, line 53: "thorugh" is changed to --through--.

Column 5, line 22: "similar" is changed to --smaller--.

Column 6, lines 7-9: "period . . . predetermined" is deleted.

Column 7, line 30: "telephoe" is changed to --telephone--.

Column 8, line 5: "noramlly" is changed to --normally--;

line 34: "formth" is changed to --forth--;

line 45: "Lf" is changed to --LF--;

line 54: "contats" is changed to --contacts--.

Column 9, line 7: "direction" is changed to --direct--.

Column 10, line 38: "tthe" is changed to --the--;

line 55: "off" is changed to --of--;

line 56: "KIA, KIB" is changed to --K1A, K1B--;

lines 64-65: "KIA, KIB" is changed to --K1A, K1B--.

Column 11, line 9: "party" is changed to --part--;

line 41: "the" is changed to --The--;

line 64: "FFIG" is changed to --FIG.--.

UNITED STATES PATENT AND TRADEMARK OFFICE
CERTIFICATE OF CORRECTION

PATENT NO. : 4,099,031

DATED : July 4, 1978

INVENTOR(S) : D. Frederic Proctor et al.

It is certified that error appears in the above-identified patent and that said Letters Patent are hereby corrected as shown below:

Column 12, line 36: "deccoder" is changed to —decoder—.

Column 16, line 50: "provision" is changed to —providing—;

line 59: "consideraion" is changed to —consideration—.

Column 18, line 28: "12is" is changed to —12 is—;

line 46: "differenentiating" is changed to —differentiating—.

Column 22, line 47: "describes" is changed to —described—.

Column 27, line 28: "automatically" is changed to —automatic—

Signed and Sealed this

Sixteenth Day of January 1979

[SEAL]

Attest:

RUTH C. MASON
*Attesting Officer*

DONALD W. BANNER
*Commissioner of Patents and Trademarks*